Aug. 29, 1939.  C. KATZ  2,171,476
COVER FOR UMBRELLAS, PARASOLS, AND SUNSHADES
Filed Dec. 21, 1936  2 Sheets-Sheet 1
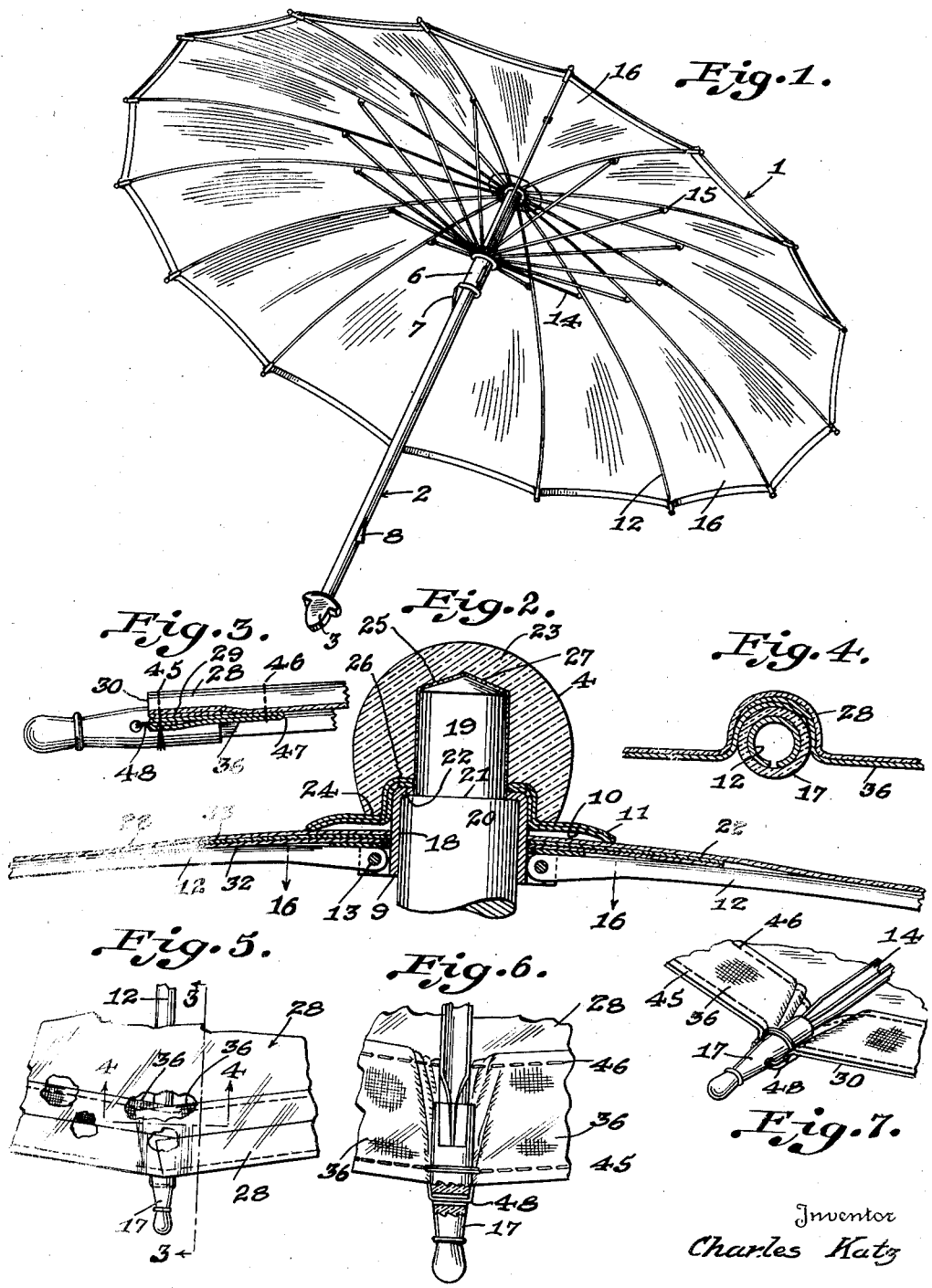
Inventor
Charles Katz
By Kimmel & Crowell
Attorneys

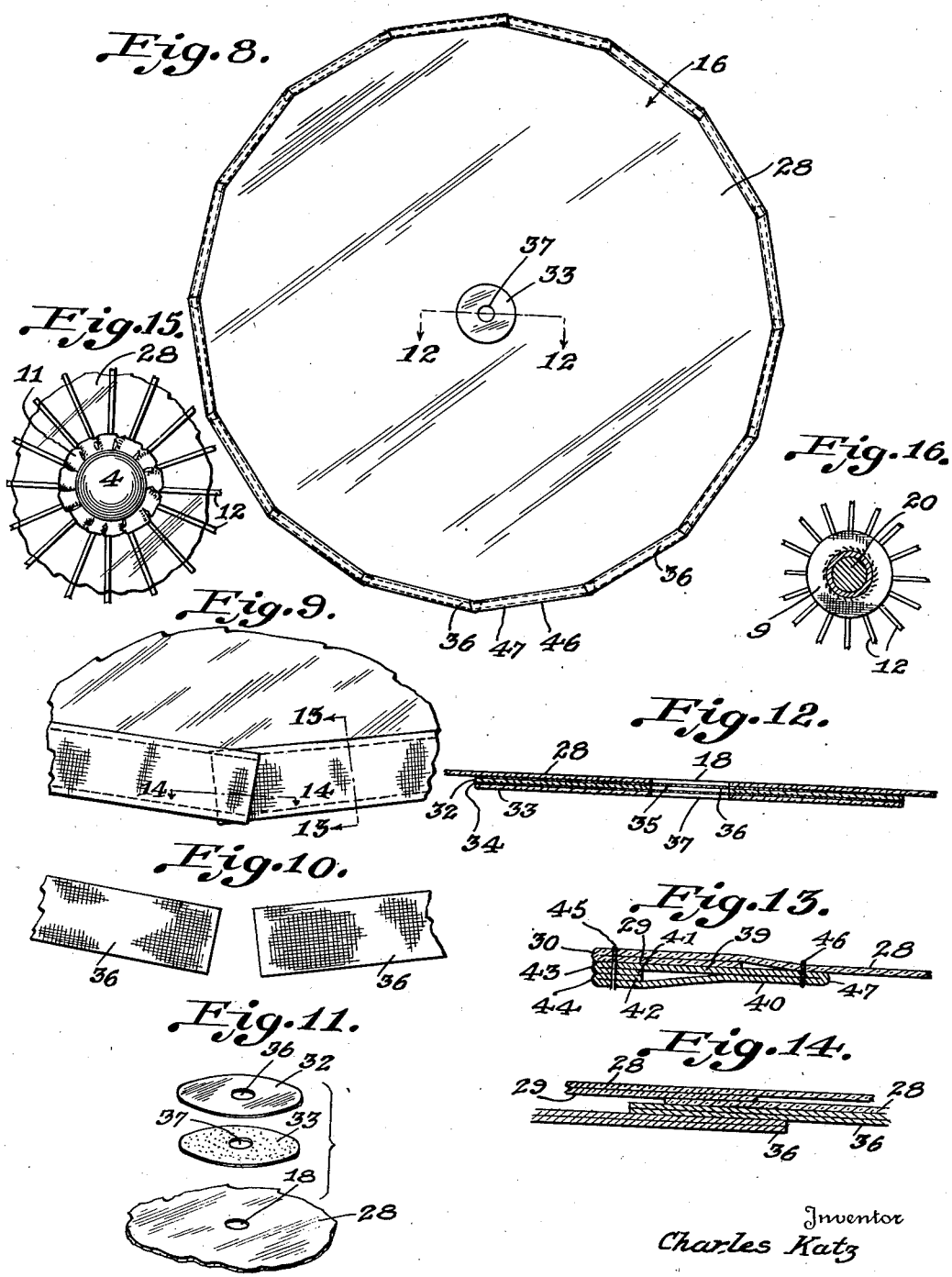

Patented Aug. 29, 1939

2,171,476

UNITED STATES PATENT OFFICE 2,171,476

COVER FOR UMBRELLAS, PARASOLS, AND SUNSHADES

Charles Katz, Baltimore, Md.

Application December 21, 1936, Serial No. 117,046

3 Claims. (Cl. 135—33)

This invention relates to umbrellas, parasols, sun-shades and the like, and has for its object to provide, in a manner as hereinafter set forth, an article of the class referred to including a one-piece cover of transparent or semi-transparent material formed with an axially arranged opening for the passage of a notched collar to which the ribs of the article are attached and with the cover having anchored thereto a reinforcement at that part thereof bordering the edge of the opening therein to reduce to a minimum the possibility of the tearing of the cover when moving it to extended position and when retained in extended position.

A further object of the invention is to provide, in a manner as hereinafter set forth, a one-piece cover for an article of the class referred to, constructed of transparent or semi-transparent material reinforced around the opening thereof through which extends the notched collar to which the ribs of the article are attached, the cover material to be any suitable transparent or semi-transparent material, but more particularly a Cellophane-like material, such latter material being impervious having a smooth surface and being of leather-like characteristic.

A further object of the invention is to provide, in a manner as hereinafter set forth, a one-piece cover for an article of the class referred to having anchored therewith a reinforcement bordering the opening in the cover for the passage of the notched collar of the article. The reinforcement being flexible and formed of a plurality of plies of material and preferably of a material corresponding to that of the cover.

A further object of the invention is to provide, in a manner as hereinafter set forth, a one-piece cover for an article of the class referred to made of transparent or semi-transparent material reinforced on its inner face at the part thereof bordering the opening of the passage for the notched collar of the article and further reinforced on its inner face throughout the outer marginal portion of such face, the reinforcements acting to reduce to a minimum the possibility of the tearing of the body of the cover when the latter is extended to and retained in extended position.

A further object of the invention is to provide, in a manner as hereinafter set forth, an article of the class referred to with a one-piece transparent or semi-transparent cover formed with reinforcing means axially thereof and at its outer marginal portion whereby the possibility of impairing the cover by tearing during the opening and closing of the cover is reduced to a minimum.

A further object of the invention, in a manner as hereinafter set forth, a one-piece cover for an article of the class referred to made of transparent or semi-transparent material and with the cover reinforced at the outer marginal portion of the inner face thereof with overlapping reinforcing members connected together and anchored to the cover.

A further object of the invention is to provide, in a manner as hereinafter set forth, a one-piece cover for an article made of transparent or semi-transparent material and reinforced to reduce the possibility of tearing of the cover to a minimum on the opening and closing of the latter.

A further object of the invention is to provide, in a manner as hereinafter set forth, a one-piece cover for an article of the class referred to made of transparent or semi-transparent material having an inherent part thereof reinforcing the outer marginal portion of the cover and further having means secured to said inherent means and to the body of the cover for additionally reinforcing the cover at the outer portion thereof.

Further objects of the invention are to provide, in a manner as hereinafter set forth, an article of the class referred to, which is simple in its constructional arrangement, strong, durable, compact, pleasing in appearance, having a transparent or semi-transparent reinforced cover, readily assembled, constructed in a manner to obtain the advantages heretofore set forth, and comparatively inexpensive to manufacture.

To the foregoing ends and to the others which may hereinafter appear, the invention consists of the novel construction, combination and arrangement of parts as will be more specifically described and are as illustrated in the accompanying drawings, wherein is shown an embodiment of the invention, but it is to be understood that changes, variations and modifications may be resorted to which fall within the scope of the invention as claimed.

In the drawings—

Figure 1 is a perspective view of an umbrella, in accordance with this invention extended and looking toward the inner face of the cover.

Figure 2 is a fragmentary view upon an enlarged scale of an umbrella with the cover in extended position, Figure 3 is a fragmentary sectional detail upon an enlarged scale and taken on line 3—3 of Figure 5, Figure 4 is a view similar to Figure 3 taken on line 4—4 of Figure 5, Figure 5 is a fragmentary view in top plan and upon an enlarged scale of the outer portion of the cover and a rib, Figure 6 is an inverted plan view of the structure shown in Figure 5, Figure 7 is a perspective view looking toward the inner face of the structure shown in Figure 5, Figure 8 is an inverted plan view of the cover prior to its connection of the ribs of the umbrella, Figure 9 is a fragmentary view upon an enlarged scale and looking toward the inner face of a cover when in non-attached position, Figure 10 is an exploded view in top plan of a pair of outer reinforcing elements with a fragmentary portion of each of said elements shown, Figure 11 is an exploded view in perspective of the inner reinforcing elements employed for bordering the axial opening of the cover and further illustrating in perspective the central portion of the cover and the arrangement of the latter relative to the inner reinforcing elements.

Figure 12 is a section on line 12—12 of Figure 8 upon an enlarged scale,

Figure 13 is a section on line 13—13 of Figure 9,

Figure 14 is a section on the line 14—14 of Figure 9,

Figure 15 is a fragmentary view in top plan of the central portion of the umbrella when the cover is extended, and Figure 16 is a section on line 16—16 of Figure 2 on a reduced scale.

The cover, in accordance with this invention, is shown by way of example as an element of an umbrella generally indicated at 1. It is to be understood, however, that the cover, in accordance with this invention, may be employed as an element of a parasol, sunshade, or the like. The umbrella 1 includes a staff 2, a handle 3 at the inner end and a ferrule 4 at the outer end of staff 2, a slotted runner 6 of the well known type slidably mounted on staff 2, spaced spring controlled latching members 7, 8 of known form carried by staff 2 for selective coaction with runner 6 to retain the umbrella open or closed, a notched collar 9 of known construction suitably secured to staff 2 inwardly adjacent its outer end, bendable superimposed sealing members 10, 11, radially disposed cover sustaining ribs 12 pivotally connected at their inner ends to the collar 9, as at 13 and extension ribs 14 pivotally connected to the ribs 12 as at 15 and also pivotally connected to the runner 6 in known manner. The foregoing elements are of known form. The umbrella as shown includes a cover 16 constructed in accordance with this invention. The tips 17 of the ribs 12 are secured to the cover 16. The latter is formed with an axial opening 18 for the passage of a part of the notched collar 9. The staff 2 as shown has a reduced outer end terminal portion 19. The junction of the latter and the other portion 20 of the staff 2 provides the staff with a peripheral shoulder 21. The collar 9 surrounds and is suitably secured to the outer part of portion 20 of staff 2. The outer end of collar 9 is formed with an inwardly extending annular flange 22 which seats against the shoulder 21 and surrounds the portion 19 of staff 2. The body 23 of the ferrule 4 is partly rounded and formed with a slightly concave inner end 24. The body 23 of ferrule 4 is provided with an axially arranged socket 25 of two different diameters whereby the wall of the socket is formed intermediate its ends with an annular shoulder 26.

The ferrule 4 is mounted on and secured to portion 19 of staff 2 by a water-repellant adhesive 27. The shoulder 26 when ferrule 4 is secured to staff 2 aligns in spaced relation with the shoulder 21. The sealing members 10, 11 are formed of any suitable waterproof material and are axially apertured. The portion 19 of staff 2 extends through the members 10, 11. The member 10 bears on cover 16, bears against collar 9 and seats on shoulder 21. When the member 11 is arranged in superimposed relation with respect to member 10 it conforms in contour to that of member 10 and bears against shoulder 26. The ferrule 4 when in secured position clamps portions of the members 10, 11 with collar 9 and holds said members 10, 11 in sealing position.

The cover 16 comprises a one-piece polygonal shaped body 28 of any suitable transparent or semi-transparent material more particularly a Cellophane-like material which has smooth surfaces and possesses leather-like and impervious characteristics. The body 28 is formed with an axial opening which provides the opening 18 and is so designated. The body 28 has a circular inner edge which is provided by the wall of opening 18, as the latter is of circular form. The body 28 has its outer marginal portions bent inwardly upon itself throughout to provide an endless fold 29 which reinforces the outer portion of body 28. The bend provided by the fold 29 is so shaped to provide the body 28 with successive inclined outer edge portions 39 merging into each other.

The cover 16 includes an inner reinforcing means for the inner edge of body 28. The said inner reinforcing means is arranged on the inner face of body 28 and is anchored to the latter and consists of a plurality of circular plies of bendable material and with such material preferably being a material corresponding to that from which the body 28 is formed. The said inner reinforcing means as shown consists of a pair of superposed axially apertured plies designated 32, 33 of like size and which are preferably anchored together by water-repellant cement 34 and with the ply 32 anchored to the inner face of body 28 by a water-repellant cement 35. The openings in the plies 32, 33 are designated 36, 37 respectively. The edges of the openings 36, 37 register with each other. The edge of opening 36 registers with the opening 18. The diameter and the thickness of the plies 32, 33 may be as desired. The plies act to reinforce the edge of opening 18 and to reduce to a minimum the possibility of the impairing of the cover 16 at the central portion thereof, more particularly at the edge of opening 18 on the extending and closing of the cover. The discs 32 and 33 are additionally secured to the cover 28 by means of stitching as shown in Figure 16 which extends through the discs 32 and 33 at a point adjacent the openings 18, 36 and 37. This stitching provides a means whereby the cover 12 is prevented from undue cracking or splitting during the bending of the cover at the point of attachment thereof to the stick 20. This stitching is shown in Figure 16 and may also constitute a means for attaching the cover 28 onto the collar 9.

The cover 16 includes an outer reinforcing means for the outer marginal portion and outer edge thereof. The said outer reinforcing means consists of a series of successive overlapping flexible separate anchored together tape-like members 38 each consisting of a rectangular web of any suitable thin fabric bent upon itself at its longitudinal center to provide inner and outer folds 39, 40 respectively. The folds 39, 40 are bent upon their opposed faces to form inwardly extending folds 41, 42 respectively having their cross sectional length less than the cross sectional length of the folds 39, 40. The bends between the folds 39, 41 provide edge portions 43. The bends between the folds 40, 42 provide edge portions 44. The edge portions 43 are flush with the edge portions 44. Each of the members 36 is of greater length than an edge portion 30. The folds 39 of the members 36 are positioned against and are of greater cross sectional length than that of fold 29. The edge portions 43, 44 are flush with the edge portions 30. The members 36 are alternately disposed in a manner whereby the lower faces of the end terminal portions of every alternate member are arranged upon the upper faces of the end terminal portions of the other of said members 36. The body 28 and folds 29, 39, 40, 41, 42 are secured together by an endless row of stitching 45 arranged in close proximity to the edge portions 30, 43 and 44. The body 28 and folds 39 and 40 are secured together by an endless row of stitching 46 arranged in close proximity, but forwardly of the bend 47 between the folds 39 and 40. The overlapped end terminal portions of the members 36 are anchored together by the rows of stitching 45, 46. The fold 29, members 36 and rows of stitching 45, 46 increase the thickness of the outer marginal portion of the cover 16 thereby increasing the strength of such portion.

At the points of connection between each pair of members 36 the outer ends of the ribs 14 and the rib tips 17 are positioned. The tips 17 extend outwardly from the aligned edge portions 30, 43 and 44. Each tip 17 is anchored to body 28, fold 29 and a pair of members 36 by the securing threads 48 which extend through the tip.

The outer reinforcing means reduces to a minimum the possibility of the body 28 tearing at the parts thereof secured to the tips 17.

The outer and inner reinforcing means have a coacting relation to prevent the tearing of the cover at its inner and outer edges.

When the outer marginal portion of the body 28 is inturned, the said portion is slitted inwardly at equidistant spaced points to provide for the overlapping of the material freed by the slits when the fold 29 is formed. The latter, owing to the slitting, will be formed of a series of sections or parts for the purpose of overlapping each other when the inclined outer edge portions 30 are formed.

What I claim is:

1. In umbrellas, a bendable cover comprising a polygonal-shaped body having its outer marginal portion inturned against its inner face, a series of narrow reinforcing strips positioned against said inturned marginal portions and the inner face of said body, said strips each comprising a longtudinally folded strip having the free edges thereof directed outwardly, each free edge being folded inwardly with the folded edges in confronting relation, the depth of the second fold being less than the depth of the first fold, stitching engaging through said second folds and said inturned marginal portion, and stitching engaging through said first fold and said body inwardly of said inturned marginal portion.

2. As a covering for an umbrella or parasol, a one-piece water-shedding transparent and translucent body formed of synthetic material, said body being provided with a substantially central opening for the passage therethrough of the umbrella or parasol stick, said body at said opening and on its under side having firmly adhesively secured thereto a reinforcing disc of like material and superimposed upon said disc another disc, said discs each provided with axial openings and said openings aligning with the said opening in the body, the inner edges of the discs and of the body being further reinforced by stitching disposed closely adjacent said apertures.

3. As a covering for an umbrella or parasol, a one-piece water-shedding transparent and translucent body formed of synthetic material, said body being provided with a substantially central opening for the passage therethrough of the umbrella or parasol stick, said body at said opening and on its under side having firmly adhesively secured thereto a reinforcing disc of like material, said disc provided with an axial opening and said opening aligning with the said opening in the body, the inner edge of the disc and of the body being further reinforced by stitching disposed closely adjacent said apertures.

CHARLES KATZ.